(12) United States Patent
Smith et al.

(10) Patent No.: US 11,793,181 B1
(45) Date of Patent: Oct. 24, 2023

(54) BAIT LOCK SOCKET

(71) Applicants: Scott Smith, Mount Pleasant, SC (US); William Dolan, Mount Pleasant, SC (US)

(72) Inventors: Scott Smith, Mount Pleasant, SC (US); William Dolan, Mount Pleasant, SC (US)

(*) Notice: Subject to any disclaimer, the term of this patent is extended or adjusted under 35 U.S.C. 154(b) by 333 days.

(21) Appl. No.: 17/209,390

(22) Filed: Mar. 23, 2021

(51) Int. Cl.
*A01K 85/18* (2006.01)
*A01K 85/02* (2006.01)

(52) U.S. Cl.
CPC .............. *A01K 85/18* (2013.01); *A01K 85/02* (2013.01)

(58) Field of Classification Search
CPC ...... A01K 85/18; A01K 85/02; A01K 83/064; A01K 85/021
USPC ........................................................ 43/42.08
See application file for complete search history.

(56) References Cited

U.S. PATENT DOCUMENTS

| | | | | |
|---|---|---|---|---|
| 2,079,883 | A * | 5/1937 | Valasek | A01K 85/16 43/42.42 |
| 4,914,851 | A * | 4/1990 | Acker | A01K 85/02 43/42.1 |
| 6,006,466 | A * | 12/1999 | Washecka | A01K 91/14 43/43.11 |
| 7,234,267 | B1 * | 6/2007 | Konstant | A01K 85/02 43/42.24 |
| 2004/0025406 | A1 * | 2/2004 | Kato | A01K 85/16 43/42.24 |
| 2004/0123510 | A1 * | 7/2004 | Essad | A01K 85/00 43/42.13 |
| 2007/0033857 | A1 * | 2/2007 | Myers | A01K 93/00 43/41 |
| 2007/0089352 | A1 * | 4/2007 | Hergott | A01K 85/00 43/42.11 |
| 2007/0193106 | A1 * | 8/2007 | Gregory | A01K 85/00 43/42.39 |
| 2007/0294934 | A1 * | 12/2007 | Myers | A01K 93/00 43/41 |
| 2009/0056196 | A1 * | 3/2009 | Korteweg | A01K 85/01 43/42.24 |
| 2011/0131863 | A1 * | 6/2011 | Parcell | A01K 85/12 43/41.2 |
| 2014/0000149 | A1 * | 1/2014 | Signitzer | A01K 85/00 43/42.02 |
| 2017/0280693 | A1 * | 10/2017 | Lehl | A01K 97/00 |
| 2019/0313616 | A1 * | 10/2019 | Aguilar | A01K 85/01 |
| 2019/0343102 | A1 * | 11/2019 | Choi | A01K 85/10 |
| 2020/0352148 | A1 * | 11/2020 | Mancini | A01K 85/01 |
| 2021/0037800 | A1 * | 2/2021 | Plihal | A01K 85/18 |
| 2021/0076650 | A1 * | 3/2021 | Bingham | A01K 85/18 |

(Continued)

FOREIGN PATENT DOCUMENTS

DE 102017123547 B3 * 2/2019
JP 2022175034 A * 11/2022

*Primary Examiner* — Christopher P Ellis
(74) *Attorney, Agent, or Firm* — Kyle A. Fletcher, Esq.

(57) ABSTRACT

The bait lock structure is a towed device. The bait lock socket is adapted for use with a bait fish. The bait lock socket is adapted for use with a game fish. The bait lock socket displays the bait fish in order to attract and capture the game fish. The bait lock socket incorporates a lure structure, a locking post, and a capture structure. The locking post secures the capture structure to the lure structure. The bait fish attaches to the lure structure. The capture structure captures the game fish.

18 Claims, 4 Drawing Sheets

(56) References Cited

U.S. PATENT DOCUMENTS

| | | | |
|---|---|---|---|
| 2022/0061281 A1* | 3/2022 | Trammell | A01K 85/18 |
| 2022/0256824 A1* | 8/2022 | Parks | A01K 83/064 |
| 2022/0264856 A1* | 8/2022 | Malooley | A01K 83/06 |
| 2022/0304293 A1* | 9/2022 | Reed | A01K 85/021 |
| 2023/0049724 A1* | 2/2023 | Fox | A01K 91/04 |

* cited by examiner

BAIT LOCK SOCKET

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of agriculture and fishing, more specifically, an artificial lure. (A01K85/18)

SUMMARY OF INVENTION

The bait lock structure is a towed device. The bait lock socket is adapted for use with a bait fish. The bait lock socket is adapted for use with a game fish. The bait lock socket displays the bait fish in order to attract and capture the game fish. The bait lock socket comprises a lure structure, a locking post, and a capture structure. The locking post secures the capture structure to the lure structure. The bait fish attaches to the lure structure. The capture structure captures the game fish.

These together with additional objects, features and advantages of the bait lock socket will be readily apparent to those of ordinary skill in the art upon reading the following detailed description of the presently preferred, but nonetheless illustrative, embodiments when taken in conjunction with the accompanying drawings.

In this respect, before explaining the current embodiments of the bait lock socket in detail, it is to be understood that the bait lock socket is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the bait lock socket.

It is therefore important that the claims be regarded as including such equivalent construction insofar as they do not depart from the spirit and scope of the bait lock socket. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
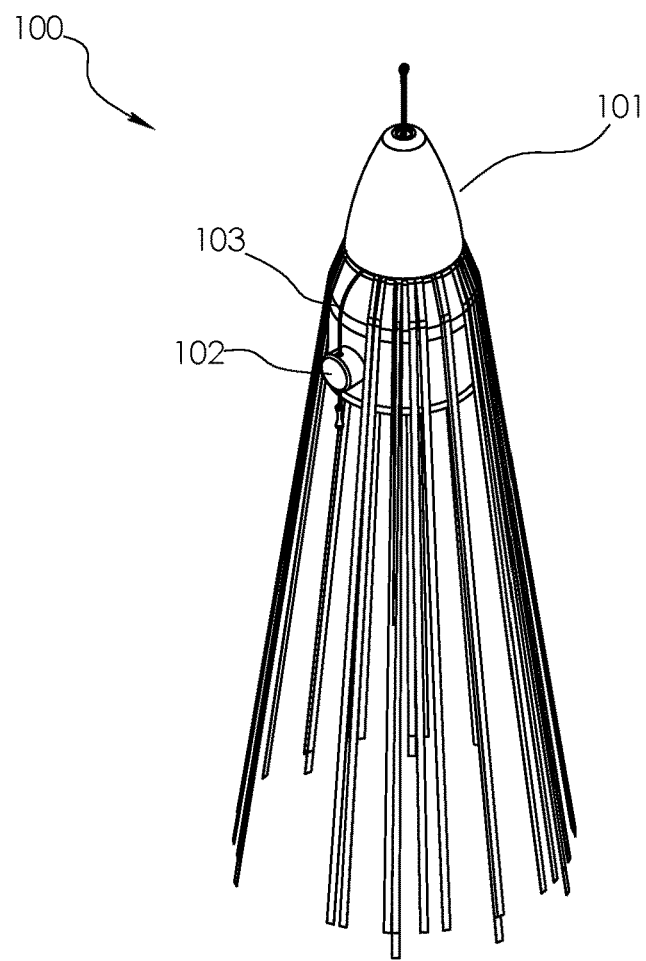
FIG. 1 is a perspective view of an embodiment of the disclosure.
Figure 2:
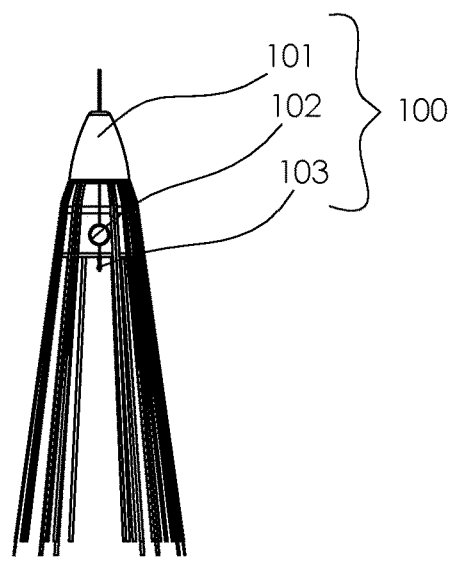
FIG. 2 is a front view of an embodiment of the disclosure.
Figure 3:
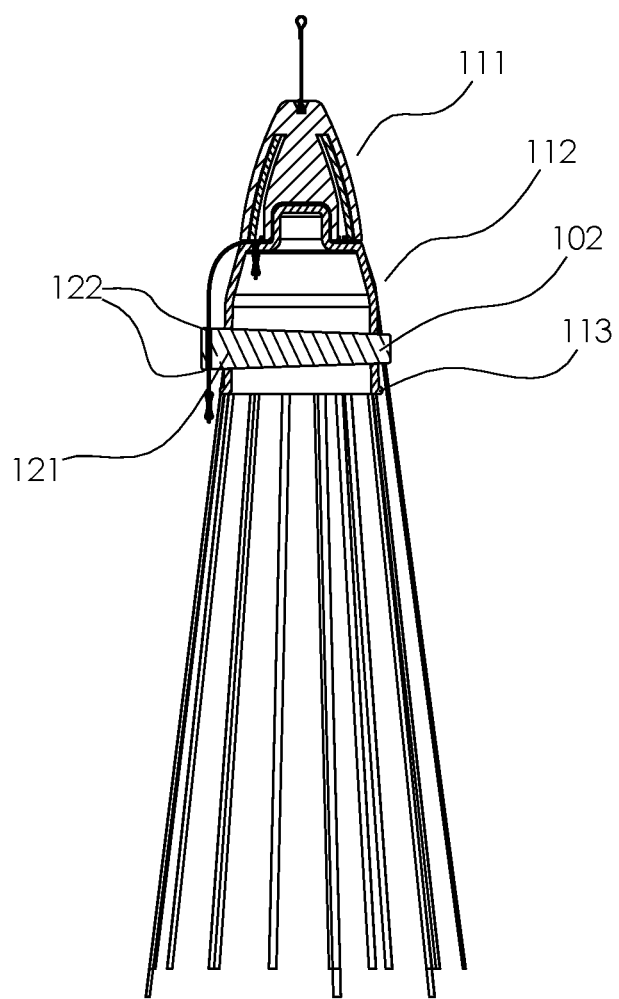
FIG. 3 is a cross-sectional view of an embodiment of the disclosure.
Figure 4:
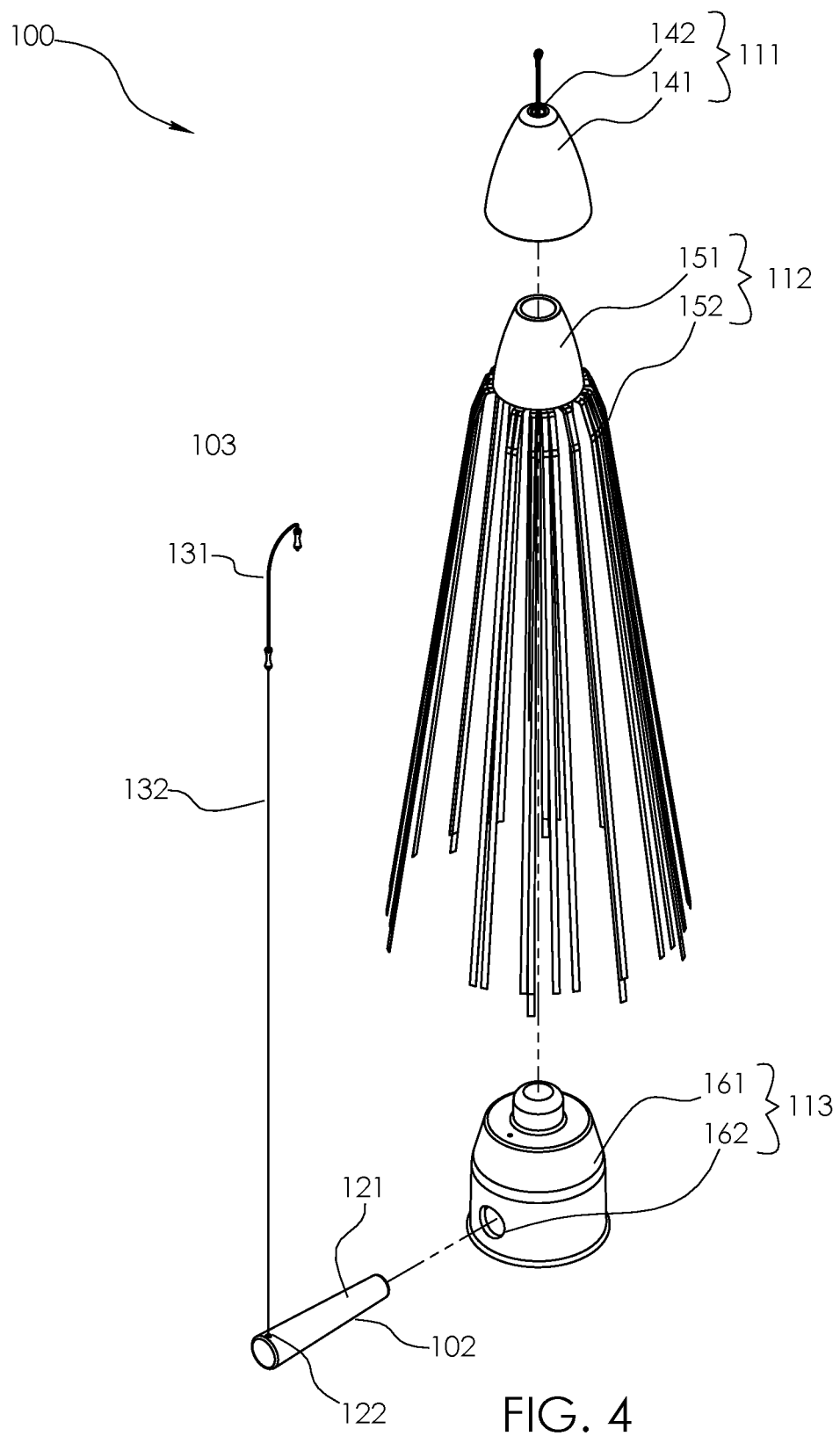
FIG. 4 is a exploded view of an embodiment of the disclosure.
Figure 5:
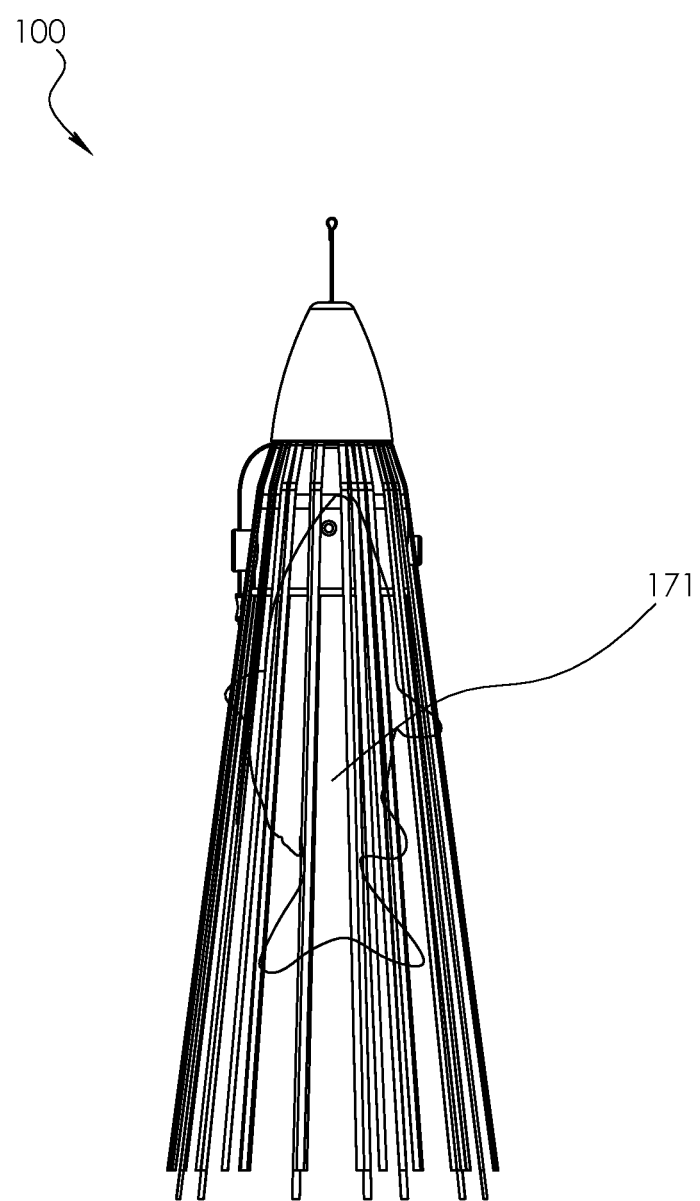
FIG. 5 is an exploded view of an embodiment of the disclosure.

Detailed reference will now be made to one or more potential embodiments of the disclosure, which are illustrated in FIGS. 1 through 5.

The bait lock structure is a towed device. The invention 100 is adapted for use with a bait fish 171. The invention 100 is adapted for use with a game fish. The invention 100 displays the bait fish 171 in order to attract and capture the game fish. The invention 100 comprises a lure structure 101, a locking post 102, and a capture structure 103. The locking post 102 secures the capture structure 103 to the lure structure 101. The bait fish 171 attaches to the lure structure 101. The capture structure captures the game fish.

The bait fish 171 is a previously captured fish that is used to attract the game fish. The game fish is a fish that the invention 100 is intended to capture.

The lure structure 101 is a mechanical structure. The lure structure 101 is adapted for use with a bait fish 171. The lure structure 101 is adapted for use with a game fish. The lure structure 101 presents the bait fish 171 to the game fish such that the lure structure 101 attracts the game fish to the invention 100. The lure structure 101 comprises a head structure 111, a skirt structure 112, and a dredge structure 113.

The head structure 111 is the leading structure of the lure structure 101. The lure structure 101 attaches to a line used to draw the invention 100 and the bait fish through the water containing the game fish. By leading structure is meant that the head structure 111 is the structure that leads the balance of the lure structure 101 through the path along which the invention 100 is towed. The head structure 111 draws the skirt structure 112, the dredge structure 113, the locking post 102, the capture structure 103, and the bait fish 171 through the water. The head structure 111 is a prism shaped structure.

The head structure 111 has a tapered prism structure. The head structure 111 comprises a head cap 141 and a swivel 142.

The head cap 141 is a prism shaped structure. The head cap 141 is a hollow structure. The head cap 141 is a prism shaped structure. The head cap 141 secures the skirt structure 112 to the swivel 142 such that the head structure 111 tows the skirt structure 112 through the water with a minimum of turbulence. The swivel 142 is a mechanical structure. The swivel 142 is defined elsewhere in this disclosure. The swivel 142 attaches the head cap 141 to the line that tows the invention 100. The swivel 142 is a rotating structure. The rotation of the swivel 142 adjusts the position of the head cap 141 relative to the towing line such that the turbulence generated by towing the lure structure 101 through the water is minimized.

The skirt structure 112 is a mechanical structure. The skirt structure 112 secures the dredge structure 113 to the head structure 111. The skirt structure 112 generates a visibly random motion that simulates the motion of a fish. The visibly random motion generated by the skirt structure 112 attracts the attention of the game fish such that the game fish is attracted towards the bait fish 171. The skirt structure 112 comprises a skirt cap 151 and a plurality of skirt strips 152.

The skirt cap 151 is a mechanical structure. The skirt cap 151 is a hollow structure. The skirt cap 151 is a prism shaped structure. The skirt cap 151 has a tapered prism structure. The skirt cap 151 secures the dredge structure 113 to the head structure 111. The plurality of skirt strips 152 forms the mechanical structure that physically generates the visibly random motion. Each of the plurality of skirt strips 152 is a sheeting that attaches to the end of the skirt cap 151 that is distal from the head cap 141. The plurality of skirt strips 152 flutters as it is towed through the water. The flutter of each of the plurality of skirt strips 152 generates the visibly random motion that attracts the game fish. Each of the plurality of skirt strips 152 is further formed with a hue that attracts the game fish.

The dredge structure 113 is a prism shaped structure. The dredge structure 113 has a composite prism structure. The dredge structure 113 secures the locking post 102 and the capture structure 103 to the lure structure 101. The dredge structure 113 secures the bait fish 171 to the lure structure 101. The dredge structure 113 positions the bait fish 171 such that the plurality of skirt strips 152 surround the bait fish 171. The dredge structure 113 comprises a dredge cap 161 and a plurality of dredge apertures 162.

The dredge cap 161 is a mechanical structure. The dredge cap 161 is a hollow structure. The dredge cap 161 is a prism shaped structure. The dredge cap 161 has a tapered prism structure. The dredge cap 161 secures the locking post 102 to the skirt cap 151. The dredge cap 161 secures the bait fish 171 to the lure structure 101. The plurality of dredge apertures 162 forms a radial hole through the tapered prism structure of the dredge cap 161. The skirt structure 112 attaches to the head structure 111 to form a composite prism structure. The dredge structure 113 attaches to the skirt structure 112 to form a composite prism structure. The head structure 111, the skirt structure 112, and the dredge structure 113 combine to form a composite prism structure.

The locking post 102 is a mechanical structure. The locking post 102 attaches the capture structure 103 to the lure structure 101. The locking post 102 comprises a post structure 121 and a plurality of post apertures 122.

The post structure 121 is a prism structure. The post structure 121 has a tapered prism shape. The post structure 121 is sized such that the plurality of dredge apertures 162 inserts into the dredge structure 113 of the lure structure 101. The taper of the tapered prism structure of the post structure 121 is such that the post structure 121 wedges into the plurality of dredge apertures 162 such that friction holds the post structure 121 relative to the dredge structure 113. The plurality of post apertures 122 forms a radial hole through the tapered prism structure of the post structure 121. The plurality of post apertures 122 forms an anchor point that secures the capture structure 103 to the post structure 121.

The post structure 121 of the locking post 102 inserts into the plurality of dredge apertures 162 of the dredge structure 113 to secure the locking post 102 to the lure structure 101. The taper of the tapered prism structure of the post structure 121 is such that the post structure 121 wedges into the plurality of dredge apertures 162 such that friction holds the post structure 121 relative to the dredge structure 113.

The capture structure 103 is a mechanical structure. The capture structure 103 captures the game fish as the game fish attempts to eat the bait fish 171. The head structure 111 is the leading structure of the lure structure 101. The lure structure 101 attaches to a line used to draw the invention 100 and the bait fish through the water containing the game fish. The capture structure 103 comprises a fishing hook 131 and a fishing line 132.

The fishing hook 131 is a mechanical structure. The fishing hook 131 is a sharpened structure. The fishing hook 131 captures the game fish. The fishing hook 131 is defined elsewhere in this disclosure. The fishing line 132 is a cord. The fishing line 132 attaches the fishing hook 131 to the locking post 102. The fishing line 132 anchors into the post structure 121 by inserting into the plurality of post apertures 122 before the post structure 121 inserts into the dredge structure 113. The fishing line 132 is defined elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Animal: As used in this disclosure, an animal is a biological organism that consumes organic material as its primary energy source for metabolism, requires oxygen for its primary metabolic processes, reproduce sexually, and form tissues.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid.

When the center axes of two cylinder, prism or pyramidal structures share the same line they are said to be aligned. When the center axes of two cylinder, prism or pyramidal structures do not share the same line they are said to be offset.

Color: As used in this disclosure, a color refers to the visible portion of the spectrum that is reflected off of an object that is exposed to an external source of electromagnetic radiation. A color is often referred to as a shade.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, yarn, and rope are synonyms for cord.

Correspond: As used in this disclosure, the term correspond is used as a comparison between two or more objects wherein one or more properties shared by the two or more objects match, agree, or align within acceptable manufacturing tolerances.

Diameter: As used in this disclosure, a diameter of an object is a straight line segment (or a radial line) that passes through the center (or center axis) of an object. The line segment of the diameter is terminated at the perimeter or boundary of the object through which the line segment of the diameter runs. A radius refers to the line segment that overlays a diameter with one termination at the center of the object. A span of a radius is always one half the span of the diameter. Include Radial Diametrically Opposed: As used in this disclosure, diametrically opposed is a term that describes the locations of a first object and a second object located at opposite ends of a diameter drawn through a third object. The term diametric opposition can also be used to describe this relationship.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Fishing Hook: As used in this disclosure, a fishing hook is a hook with a sharpened, and often barbed, end that is used to capture a fish.

Fishing Line: As used in this disclosure, a fishing line is a monofilament cord to which a hook is attached for the purpose of capturing a fish.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Game Animal: As used in this disclosure, a game animal is an animal that is targeted by a hunter or fisherperson during hunting or fishing activities.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hook: As used in this disclosure, a hook is an object that is curved or bent at an angle such that items can be hung on or caught by the object.

Hue: As used in this disclosure, a hue refers to a specific color.

Lure: As used in this disclosure, a lure is an object used to attract an animal towards an object.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the structure. The major and minor axes intersect at the center of the structure. The major axis is always parallel to the longest edge of a rectangular structure.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Path: As used in this structure, a path is a marked or identified route along which an individual or object can travel. A path is often formed as a track, a road or a trail.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Strip: As used in this disclosure, the term describes a long thin object of uniform width. Strips are often rectangular blocks in shape.

Swivel: As used in this disclosure, a swivel is a fastening structure that attaches a first object to a second object such that will rotate around an axis of rotation while the second object remains in a fixed position relative to the first object.

Taper: As used in this disclosure, a taper is a continuous and typically, but not necessarily gradual, change in the span of the length of a structure in the direction parallel a direction selected from the group selected from the major axis and the minor axis of the structure. The change in the span of the length occurs as an apparent function of the measurement position along the unselected axis of the object.

Tapered Disk Structure: As used in this disclosure, a tapered disk structure is a modified disk structure that is formed when: a) the first congruent end of the underlying structure disk structure and the second congruent end of the underlying structure disk structure form Euclidean surfaces; and; b) first congruent end of the underlying structure disk structure and the second congruent end of the underlying structure disk structure are not parallel to each other. Typically, the thickness of the modified disk structure at any point on a congruent end of the tapered disk structure varies as a linear function of the coordinates that identify the selected point. A tapered disk structure often looks like, and is referred to as a wedge. Use Center, Major, Minor, and Thickness Dimensions and Euclidean plane Tapered Prism Structure: As used in this disclosure, a tapered prism structure is a modified prism structure that is formed such that the first congruent end of the modified prism structure is geometrically similar to, but not geometrically identical to the second congruent end of the modified prism. The span of length of a radial line from the center axis to the lateral face of the modified prism structure will vary as a function of its position along the center axis. Always use taper.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A bait lock comprising
a lure structure, a locking post, and a capture structure;
wherein the locking post attaches the capture structure to the lure structure;
wherein the bait lock is adapted for use with a bait fish;
wherein the bait lock is adapted for use with a game fish;
wherein the bait fish is a previously captured fish that is used to attract the game fish;
wherein the game fish is a fish that the bait lock is intended to capture;
wherein the lure structure comprises a head structure, a skirt structure, and a dredge structure;
wherein the skirt structure attaches the dredge structure to the head structure;
wherein the dredge structure secures the bait fish to the lure structure.

2. The bait lock according to claim 1
wherein the lure structure is a mechanical structure;
wherein the lure structure is adapted for use with the bait fish;
wherein the lure structure is adapted for use with the game fish;
wherein the lure structure presents the bait fish to the game fish such that the lure structure attracts the game fish to the bait lock.

3. The bait lock according to claim 2
wherein the lure structure attaches to a line used to draw the bait lock and the bait fish through the water containing the game fish;
wherein the head structure is the leading structure of the lure structure;
wherein by leading structure is meant that the head structure is the structure that leads the balance of the lure structure through the path along which the bait lock is towed.

4. The bait lock according to claim 3
wherein the head structure has a tapered structure;
wherein the head structure comprises a head cap and a swivel;
wherein the head cap is a hollow structure;
wherein the head cap secures the skirt structure to the swivel such that the head structure tows the skirt structure through the water with a minimum of turbulence;
wherein the swivel is a mechanical structure;
wherein the swivel attaches the head cap to the line that tows the bait lock;
wherein the swivel is a rotating structure;
wherein the rotation of the swivel adjusts the position of the head cap relative to the towing line such that the turbulence generated by towing the lure structure through the water is minimized;
wherein the skirt structure is a mechanical structure;
wherein the skirt structure secures the dredge structure to the head structure.

5. The bait lock according to claim 4
wherein the skirt structure generates a visibly random motion that simulates the motion of a fish;
wherein the visibly random motion generated by the skirt structure attracts the attention of the game fish such that the game fish is attracted towards the bait fish.

6. The bait lock according to claim 5
wherein the skirt structure comprises a skirt cap and a plurality of skirt strips;
wherein the plurality of skirt strips attach to the skirt cap.

7. The bait lock according to claim 6
wherein the skirt cap is a mechanical structure;
wherein the skirt cap is a hollow structure;
wherein the skirt cap has a tapered structure;
wherein the skirt cap secures the dredge structure to the head structure.

8. The bait lock according to claim 7
wherein the plurality of skirt strips forms the mechanical structure that physically generates the visibly random motion;
wherein each of the plurality of skirt strips is a sheeting that attaches to the end of the skirt cap that is distal from the head cap;
wherein the plurality of skirt strips flutters as it is towed through the water;
wherein the flutter of each of the plurality of skirt strips generates the visibly random motion that attracts the game fish;
wherein each of the plurality of skirt strips is further formed with a hue that attracts the game fish.

9. The bait lock according to claim 8
wherein the dredge structure has a composite structure;
wherein the dredge structure secures the locking post and the capture structure to the lure structure;
wherein the dredge structure secures the bait fish to the lure structure;
wherein the dredge structure positions the bait fish such that the plurality of skirt strips surround the bait fish.

10. The bait lock according to claim 9
wherein the dredge structure comprises a dredge cap and a plurality of dredge apertures;
wherein the plurality of dredge apertures are formed in the dredge cap.

11. The bait lock according to claim 10
wherein the dredge cap is a mechanical structure;
wherein the dredge cap is a hollow structure;
wherein the dredge cap has a tapered structure;
wherein the dredge cap secures the locking post to the skirt cap;
wherein the dredge cap secures the bait fish to the lure structure.

12. The bait lock according to claim 11 wherein the plurality of dredge apertures forms a radial hole through the tapered structure of the dredge cap.

13. The bait lock according to claim 12
wherein the skirt structure attaches to the head structure to form a composite structure;
wherein the dredge structure attaches to the skirt structure to form a composite structure;
wherein the head structure, the skirt structure, and the dredge structure combine to form a composite structure.

14. The bait lock according to claim 13
wherein the locking post is a mechanical structure;
wherein the locking post attaches the capture structure to the lure structure.

15. The bait lock according to claim 14
wherein the locking post comprises a post structure and a plurality of post apertures;
wherein the post structure has a tapered shape;
wherein the post structure is sized such that the plurality of dredge apertures inserts into the dredge structure of the lure structure.

16. The bait lock according to claim 15
wherein the plurality of post apertures forms a radial hole through the tapered structure of the post structure;
wherein the plurality of post apertures forms an anchor point that secures the capture structure to the post structure;
wherein the post structure of the locking post inserts into the plurality of dredge apertures of the dredge structure to secure the locking post to the lure structure.

17. The bait lock according to claim 16
wherein the capture structure is a mechanical structure;
wherein the capture structure captures the game fish as the game fish attempts to eat the bait fish;
wherein the head structure is the leading structure of the lure structure;
wherein the lure structure attaches to a line used to draw the bait lock and the bait fish through the water containing the game fish.

18. The bait lock according to claim 17
wherein the capture structure comprises a fishing hook and a fishing line;
wherein the fishing hook is a mechanical structure;
wherein the fishing hook is a sharpened structure;
wherein the fishing hook captures the game fish;
wherein the fishing line is a cord;
wherein the fishing line attaches the fishing hook to the locking post;
wherein the fishing line anchors into the post structure by inserting into the plurality of post apertures before the post structure inserts into the dredge structure.

* * * * *